(12) United States Patent
Ogami et al.

(10) Patent No.: US 8,179,010 B2
(45) Date of Patent: May 15, 2012

(54) PERMANENT MAGNET TYPE ROTOR HAVING IMPROVED MAGNET FIXING

(75) Inventors: Masaki Ogami, Saitama (JP); Hiroyuki Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 12/495,262

(22) Filed: Jun. 30, 2009

(65) Prior Publication Data

US 2010/0001606 A1 Jan. 7, 2010

(30) Foreign Application Priority Data

Jul. 7, 2008 (JP) ................................. 2008-177229

(51) Int. Cl.
*H02K 1/27* (2006.01)
*H02K 15/03* (2006.01)

(52) U.S. Cl. ......... 310/156.53; 310/156.22; 310/156.23; 310/156.46; 29/598

(58) Field of Classification Search ............. 310/156.53, 310/156.22, 156.23, 156.46, 400, 417; 29/598; H02K 1/27, 15/03
See application file for complete search history.

(56) References Cited

U.S. PATENT DOCUMENTS

| | | | | |
|---|---|---|---|---|
| 5,650,680 A | * | 7/1997 | Chula | 310/156.53 |
| 7,262,526 B2 | * | 8/2007 | Shiga et al. | 310/156.53 |
| 2004/0263012 A1 | * | 12/2004 | Dommsch et al. | 310/156.22 |
| 2005/0200223 A1 | * | 9/2005 | Tajima et al. | 310/156.46 |
| 2006/0186752 A1 | * | 8/2006 | Matsumoto et al. | 310/156.53 |
| 2007/0063607 A1 | * | 3/2007 | Hattori | 310/156.53 |
| 2009/0045689 A1 | | 2/2009 | Haruno et al. | |

FOREIGN PATENT DOCUMENTS

| | | | |
|---|---|---|---|
| JP | 05-83892 A | | 4/1993 |
| JP | 2006-204010 A | | 8/2006 |
| JP | 2006204010 A | * | 8/2006 |
| JP | 2007-49805 A | | 2/2007 |
| JP | 2007049805 A | * | 2/2007 |
| JP | 2007-336718 A | | 12/2007 |

OTHER PUBLICATIONS

Machine translation of JP2006-204010.*
Machine translation of JP2007-049805.*

* cited by examiner

*Primary Examiner* — Quyen Leung
*Assistant Examiner* — Michael Andrews
(74) *Attorney, Agent, or Firm* — Arent Fox LLP

(57) ABSTRACT

A rotor is provided. The rotor includes a rotor iron core including slots formed around an outer circumferential portion thereof; magnet pieces which are inserted into the slots, respectively, such that a magnetic orientation of the magnet pieces are inverted every predetermined number of the slots; and two end plates, one end plate disposed on each end side in an axial direction of the rotor iron core, the two end plates covering the slots in the axial direction. The rotor iron core also includes cutout portions, which are located at an interval between adjacent ones of the slots, each of the cutout portions extending in the axial direction of the rotor iron core. One of the two end plates includes injection openings, each of which corresponds to a respective one of the slots, and communicating grooves each of which is formed so as to communicate with one of the cutout portions.

8 Claims, 8 Drawing Sheets

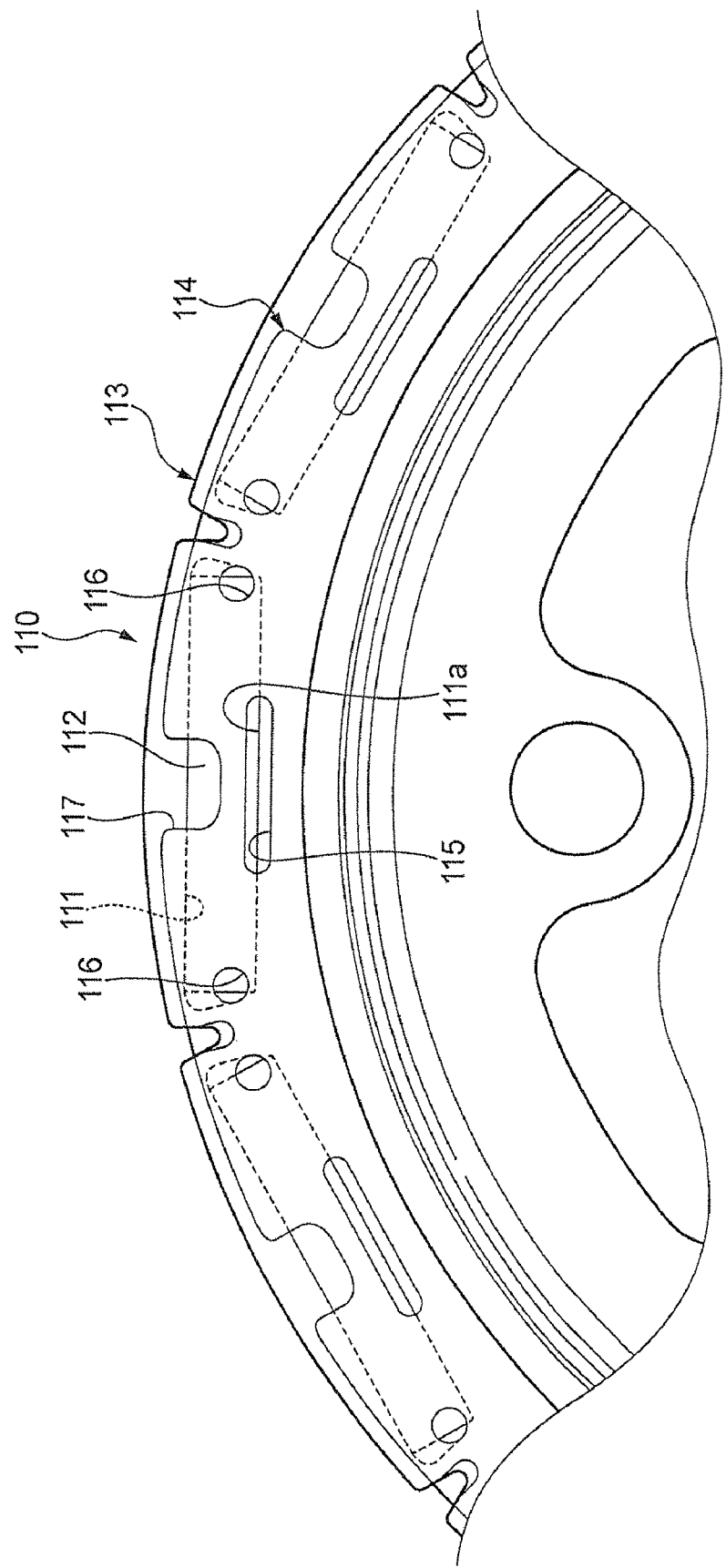
Fig. 8 "PRIOR ART"

PERMANENT MAGNET TYPE ROTOR HAVING IMPROVED MAGNET FIXING

This application claims priority from Japanese Patent Application No. 2008-177229, filed on Jul. 7, 2008, the entire contents of which are hereby incorporated by reference.

FIELD OF THE INVENTION

Apparatuses and device consistent with the present disclosure relate to rotors and, more particularly, to magnet type rotors.

DESCRIPTION OF RELATED ART

Japanese Unexamined Patent Application Publication No. JP-A-2007-49805 describes a related art rotor used in a motor. The related art rotor is configured by respectively inserting permanent magnet pieces into slots formed at a rotor iron core configured by laminating many disk-shaped steel plates.

As shown in FIG. 7, in a related art rotor 100 described in JP-A-2007-49805, a rotor iron core 102 is configured by laminating many disk-shaped steel plates each provided with a plurality of magnet insertion holes (slots) 101 near an outer periphery of the rotor iron core 102. A permanent magnet piece 103 is inserted into each of the magnet insertion holes 101. Each of both sides surfaces 101a, 101a in a circumferential direction of the magnet insertion hole 101 is tapered so as to be opened in a progressing manner toward a radial outside. Further, each of both side surfaces 103a, 103a in a circumferential direction of the permanent magnet piece 103, which has a rectangular section, are provided with mold resin portions 104 having slanted surfaces corresponding to the side surfaces 101a, respectively, in a circumferential direction of the magnet insertion hole 101.

Thus, when the permanent magnet piece 103 is pressed into the magnet insertion hole 101, both side surfaces 101a are pressed by a reaction force due to an elastic compression of the mold resin portions 104. Thus, the permanent magnet piece 103 is moved to the outer peripheral side within the magnet insertion hole 101 and fixedly positioned. As a result, it is possible to prevent the generation of an abnormal noise by a wobbling of the permanent magnet piece 103. Further, when the rotor 100 is disposed so as to be close to a stator, an efficiency of the motor can be improved since a magnetic force of the permanent magnet piece 103 is utilized effectively.

Moreover, in the rotor 100 described in FIG. 7, a gap 105 is formed between the inner peripheral-side side surface of the permanent magnet piece 103 and the inner peripheral side inner wall of the magnet insertion hole 101, and resin is filled into the gap 105 and solidified. However, JP-A-2007-49805 provides no description as to how the resin is filled into the gap 105 or how the resin is cured.

In another related art rotor 110 as shown in FIG. 8, magnet insertion holes 111 are each provided with a shim insertion inlet 115 and an end plate 114 covering both end faces in an axial direction of a rotor iron core 113. The shim insertion inlet 115 allows a shim (not shown) to be inserted between a permanent magnet piece 112 inserted into the magnet insertion hole 111 and an inner peripheral surface 111a of the magnet insertion hole 111. Injection inlets 116 are also provided for each magnet insertion hole 111 for injecting silicon in the both end surface positions in a circumferential direction of the permanent magnet piece 112, and an air vent port 117 formed on an outer peripheral side of the permanent magnet piece 112 is also provided. Thus, after the shim is inserted into the shim insertion inlet 115 to move the permanent magnet piece 112 toward the outer peripheral side, the silicon for fixing the permanent magnet piece 112 into the magnet insertion hole 111 is injected into the injection inlets 116.

In the rotor 110 shown in FIG. 8, there are some disadvantages in that the rotor 110 takes a long time to manufacture since the silicon is injected by dropping the silicon through the injection inlet 116 naturally, and in that the number of processes increases since it is required to move the permanent magnet piece 112 toward the outer peripheral side by inserting the shim. Further, it is advantageous to automate the injection and shorten the fabricating time by injecting the silicon with a pressure. However, in the rotor 110 shown in FIG. 8, the end plates 114 having the shim insertion inlet 115, the injection inlets 116 and the air vent port 117 do not seal well. Accordingly, the permanent magnet piece 112 can not be moved sufficiently toward the outer peripheral side when silicon is injected under pressure.

SUMMARY OF INVENTION

Illustrative aspects of the present invention provide a rotor which can reduce a manufacturing time and a number of processes used to move permanent magnet pieces to the outer peripheral side and surely fix the permanent magnet pieces in place.

According to one or more illustrative aspects of the invention, there is provided a rotor comprising a rotor iron core comprising a plurality of slots formed around an outer circumferential portion thereof; a plurality of magnet pieces which are inserted into the plurality of slots, respectively, such that a magnetic orientation of the magnet pieces are inverted every predetermined number of the slots; and two end plates, one end plate disposed on each end side in an axial direction of the rotor iron core, the two end plates covering the plurality of slots in the axial direction, wherein the rotor iron core further comprises a plurality of cutout portions, which are located at an interval between adjacent ones of the slots, each of the cutout portions extending in the axial direction of the rotor iron core, one of the two end plates comprises a plurality of injection openings, each of which corresponds to a respective one of the plurality of slots, and a plurality of communicating grooves each of which is formed so as to communicate with one of the cutout portions.

Other aspects and advantages of the invention will be apparent from the following description, the drawings and the claims.

BRIEF DESCRIPTION OF THE DRAWINGS

FIG. 8 is an enlarged front view of another related art permanent magnet type rotor.

DETAILED DESCRIPTION OF EXEMPLARY EMBODIMENTS

First Exemplary Embodiment

Hereinafter, a permanent magnet type rotor according to a first exemplary embodiment of the invention will be explained in detail with reference to FIGS. 1 to 4.

Figure 1:
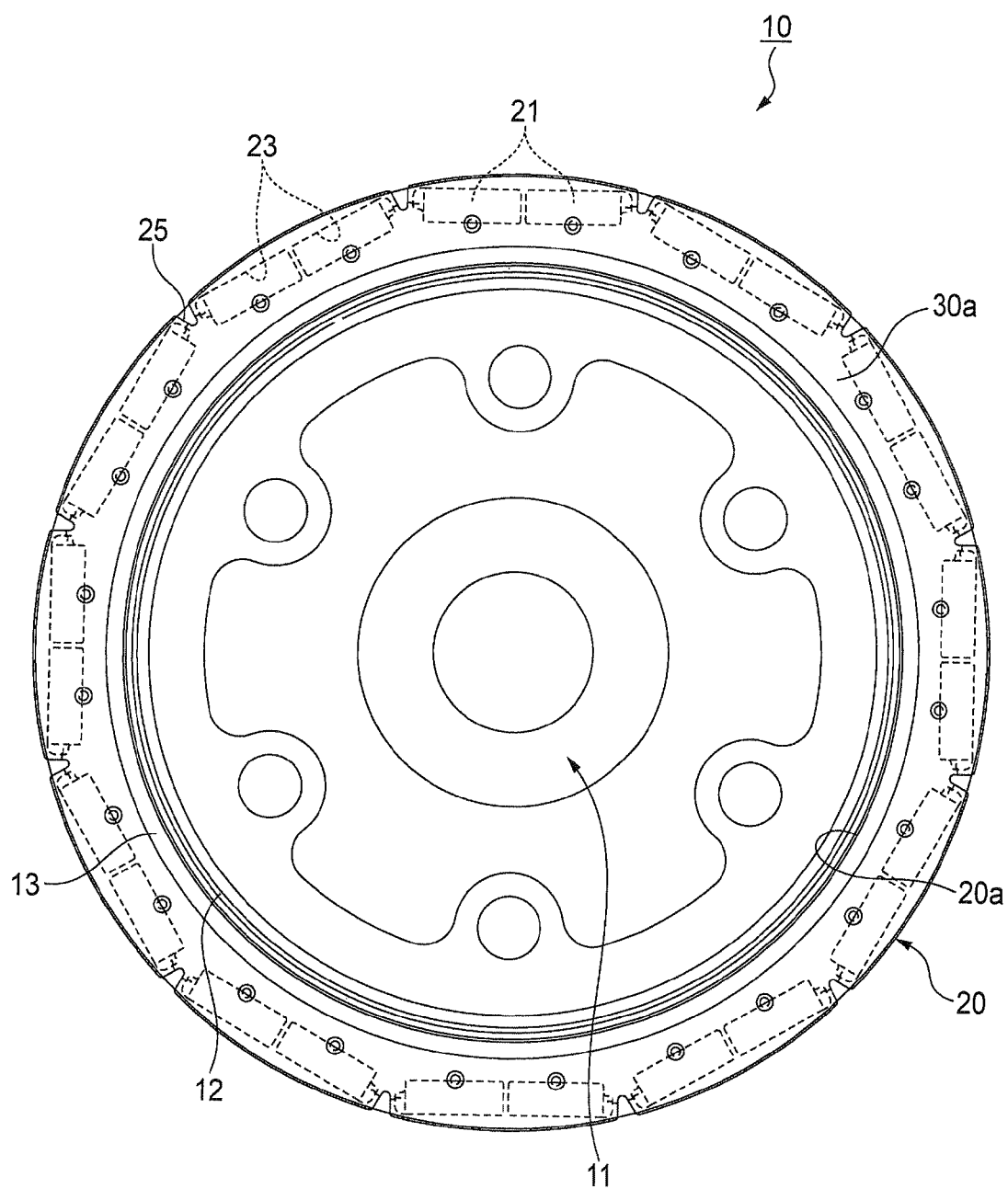
FIG. 1 is a front view showing a permanent magnet type rotor according to a first exemplary embodiment of the invention.
Figure 2:
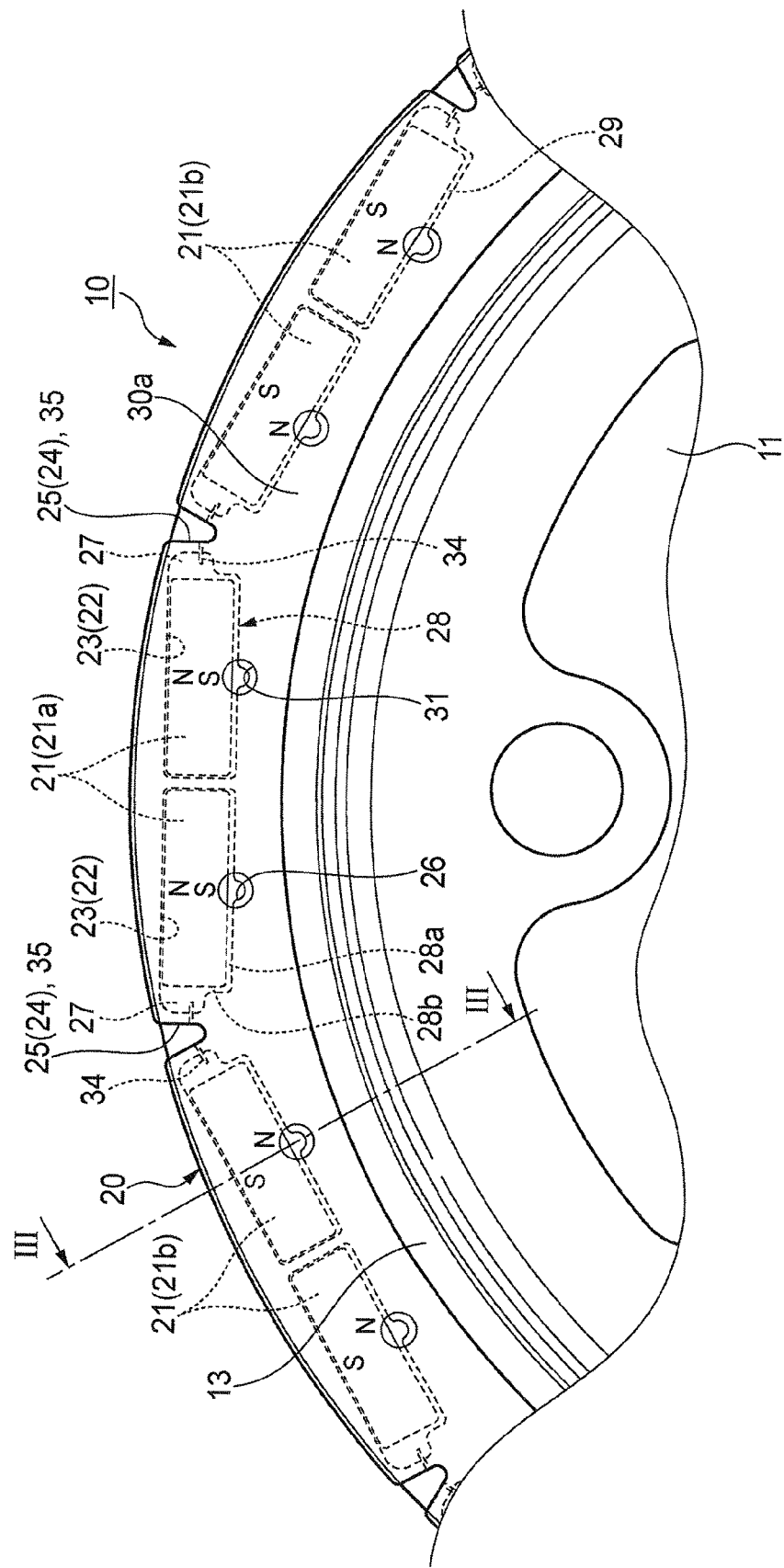
FIG. 2 is an enlarged front view of a portion of the rotor of FIG. 1.
Figure 3:
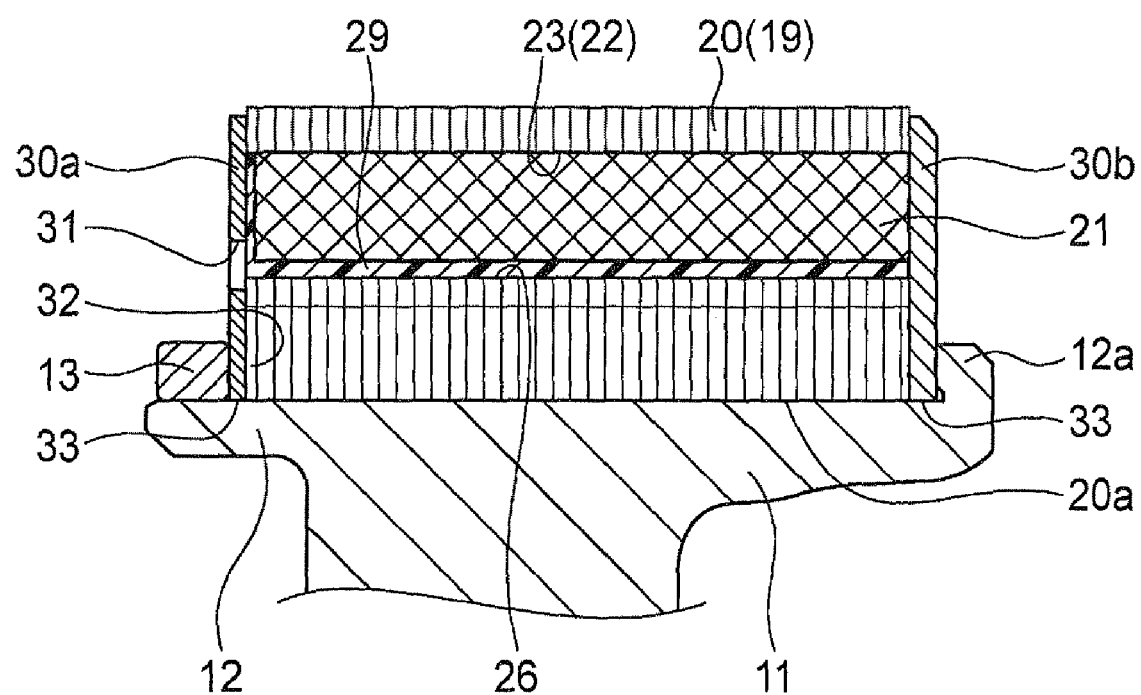
FIG. 3 is a sectional view cut along a line III-III in FIG. 2.

As shown in FIGS. 1 to 3, a permanent magnet type rotor 10 according to the first exemplary embodiment includes a shaft 1 acting as a rotary shaft, a rotor iron core 20 attached to an outside of the rotor shaft 1, a plurality of permanent magnet pieces 21 attached to the rotor iron core 20, a pair of end plates 30a, 30b respectively disposed at both end sides in an axial direction of the rotor iron core 20 in order to prevent the permanent magnet pieces 21 from falling, and a collar 13 for fixing the rotor iron core 20 and the end plates 30a, 30b to the rotor shaft 1.

The rotor iron core 20 is configured by laminating many disc-shaped silicon steel plates 19, for example. Each of the steel plates 19 is provided with an attachment hole 20a at a center thereof into which an iron core attachment portion 12 of the rotor shaft 1 is inserted. As shown in FIG. 2, a plurality of notches 24 each having an almost V-shape are provided at an outer peripheral portion of each of the steel plates 19 at an interval. Two magnet insertion opening portions 22 each having a rectangular shape are formed between the adjacent notches 24. Since the notches 24 and the magnet insertion opening portions 22 are provided at the same positions in each of the steel plates 19, when the steel plates 19 are laminated, the notches 24 are aligned so as to form a plurality of grooves 25 extending in the axial direction at the outer periphery portion of the rotor 10, and the magnet insertion opening portions 22 are aligned so as to form a plurality of slots 23 extending in the axial direction at the inner portion.

The permanent magnet pieces 21 are inserted into the slots 23 in a manner that the magnetic pole is changed every predetermined number of slots 23 (e.g., the magnetic pole is changed after every two in the first exemplary embodiment) (see FIG. 2). For example, the outer peripheral side is set to be north (N) pole in each of the two permanent magnet pieces 21a, while the outer peripheral side is set to be south (S) pole in each of the two permanent magnet pieces 21b which are disposed in adjacent position to the two permanent magnet pieces 21a across the groove 25 extending in the axial direction. Thus, the groove 25 extending in the axial direction is formed between the adjacent magnetic poles of the rotor iron core 20.

The slot 23 is formed to have a sectional size slightly larger than the sectional size of the permanent magnet piece 21, whereby a gap is formed between an external surface of the permanent magnet piece 21 and an inner surface of the slot 23 in a state that the permanent magnet piece 21 is inserted into the slot 23.

The rotor iron core 20 is provided with first induction grooves 26 each of which is opened on an inner peripheral side in the radial direction of the corresponding one of the slot 23 and extends in the axial direction. The first induction groove 26 is preferably provided at the center portion in the longitudinal direction (that is, circumferential direction) of the permanent magnet piece 21 or the slot 23 when seen from the axial direction. Further, at the one side (the side close to the groove 25 in this case) of the circumferential end portions of the slot 23, a second induction groove 27 is formed which is opened on a circumferential end portion of the slot 23 and extends in the axial direction. The second induction groove 27 is disposed on the outer peripheral side in the radial direction of the circumferential end portion of the slot 23 and is formed so as to continue from the outer periphery surface in the radial direction of the slot 23. The shapes of the first induction groove 26 and the second induction groove 27 are not limited to a semicircular shape and a U-shape shown in FIG. 2, respectively, but may be any shape so long as they are opened toward the slot 23.

Thus, as shown in FIG. 2, the first induction groove 26 and the second induction groove 27 open to the slot 23 and so communicate via the slot 23. That is, the first induction groove 26 and the second induction groove 27 are coupled to each other via gaps 28a, 28b formed between the inner surface of the slot 23 and the outer surface of the permanent magnet piece 21 to thereby form a flow path 28. Thus, as described later, seal material 29 such as silicon is filled within the flow path 28, whereby the permanent magnet piece 21 is fixed at a predetermined position within the slot 23.

Further, as shown in FIG. 3, the pair of end plates 30a, 30b each having a disc shape are formed by non-magnetic material such as austenitic stainless steel. The end plates 30a, 30b are disposed on both sides in the axial direction of the rotor iron core 20 so as to close both side openings in the axial direction of the slot 23 of the rotor iron core 20, respectively. An attachment hole 33 for receiving the iron core attachment portion 12 therein is provided at a center portion of each of the end plates 30a, 30b. The other end plate 30b of the pair of the end plates 30a, 30b is abutted against an engagement portion 12a provided at the one end of the rotor shaft 11 so as to protrude outward to thereby support the one end portion in the axial direction of the rotor iron core 20. Further, the one end plate 30a is fixed by the collar 13 in a state of abutting against the end portion in the axial direction of the rotor iron core 20, at the other end of the rotor shaft 11. Thus, the rotor iron core 20 is integrated in a manner of being sandwiched at the both end portions in the axial direction thereof between the pair of the end plates 30a, 30b and acts to prevent the permanent magnet pieces 21 from sliding out.

Figure 4:
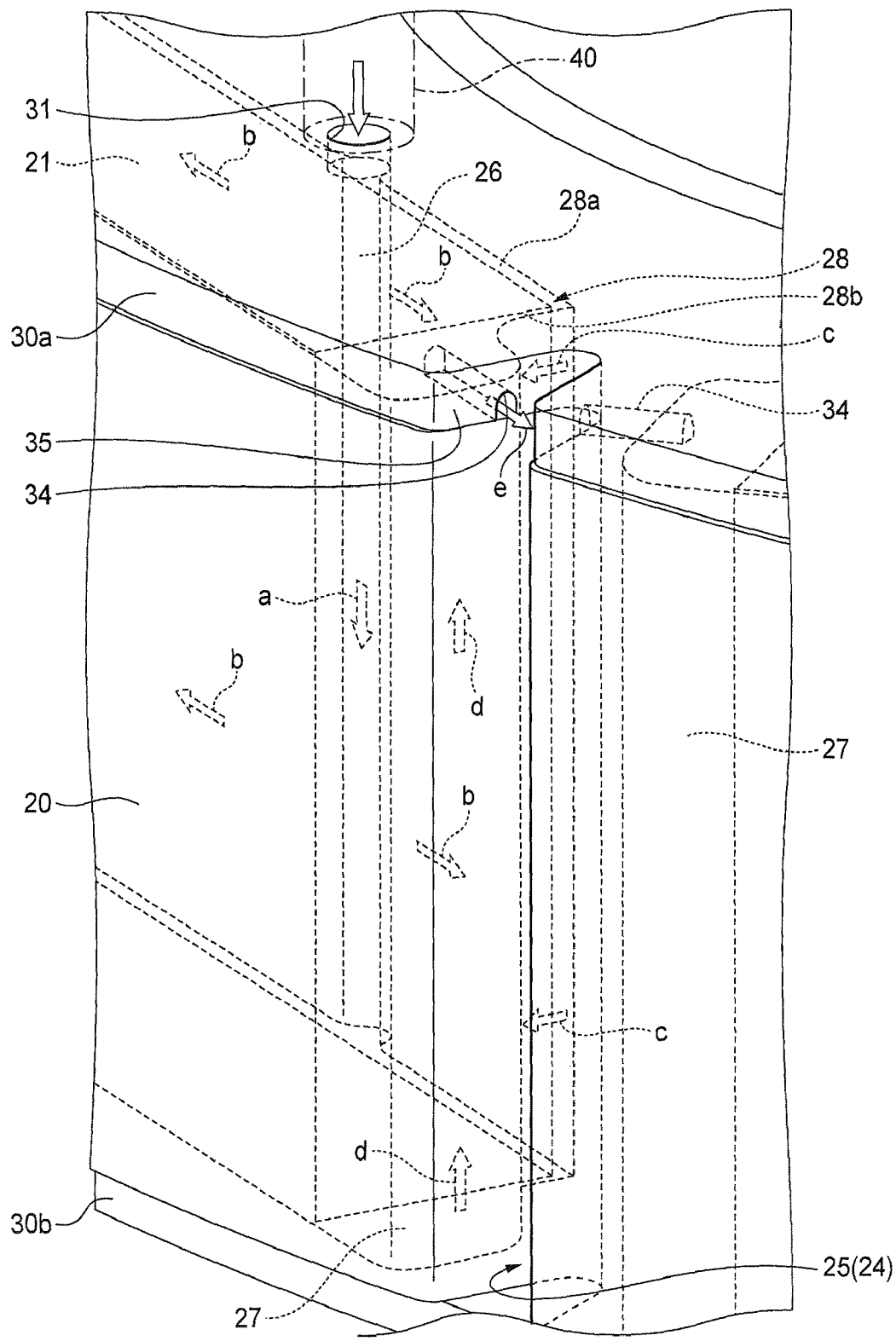
FIG. 4 is a front view showing a filling state of seal material and an air vent path.

As shown in FIGS. 2 to 4, the one end plate 30a is provided with seal member injection opening portions 31 each formed at the position corresponding to the first induction groove 26. The first induction groove 26 is opened to the outside of the permanent magnet type rotor 10 via the opening portion 31. Further, a notch 35 having the same shape as the groove 25 in the axial direction of the rotor iron core 20 is formed at the one end plate 30a. Furthermore, in the one end plate 30a, at a surface 32 (lower surface in FIG. 4) opposing to the end surface in the axial direction of the rotor iron core 20, a communicating groove 34 is formed which communicates with the second induction groove 27 opened at the end portion in the axial direction of the rotor iron core 20 and the grooves 25, in the axial direction.

In order to manufacture the permanent magnet type rotor 10 thus configured, firstly the other end plate 30b is inserted into the rotor shaft 11 and fixed to the rotor shaft 11 such that the other end plate 30b is abutted against the engagement portion 12a of the rotor shaft 11. Thereafter, the rotor iron core 20 is pressed into the rotor shaft 11 and the permanent magnet pieces 21 are respectively inserted into the slot 23 by changing directions of the magnetic pole so that the direction of the magnetic pole is changed at every the groove 25 in the axial direction. Then, the one end plate 30a is inserted into the rotor shaft 11 and the collar 13 is attached so as to prevent the one end plate 30a from moving.

Next, as shown in FIG. 4, the seal material 29 is injected into the slot 23 via the opening portion 31 of the one end plate 30a from an injection port 40 of an automatic injection machine (not shown) to thereby fix the permanent magnet piece 21 in place. In this case, the seal material 29 is injected into the first induction groove 26 of the rotor iron core 20 (arrow a in FIG. 4) and fed in the axial and circumferential directions in the gap 28a between inner peripheral-side side surface of the slot 23 and the permanent magnet piece 21 (arrow b). Thus, the seal material 29 within the gap 28a acts to push the permanent magnet piece 21 toward the outer peripheral side within the slot 23 by the pressure at the time of the injection. The seal material 29 enters into the radial direction gap 28b between the permanent magnet piece 21 and the slot 23 from the gap 28a (arrow c), then further enters into the second induction groove 27 and is contained therein. The seal material, 29 thus contained within the second induction groove 27 is gradually filled from the other end portion in the axial direction of the rotor iron core 20 (that is, the end plate 30b side) (arrow d) and reaches the end plate 30a. As a result, the flow path 28 is filled with the seal material 29 and hence the permanent magnet piece 21 is urged toward the outer peripheral side and fixed into the slot 23. Further, excessive seal material 29 is exhausted into the axial groove 25 from the communicating groove 34 provided at the surface 32 opposing to the rotor iron core 20 of the one end plate 30a (arrow e).

In the aforesaid series operations for injecting the seal material 29, the air previously contained in the flow path 28 is pushed out to the second induction groove 27 via the gaps 28a, 28b from the first induction groove 26 in accordance with the injection of the seal material 29. And then, the air is pushed out into the axial groove 25 via the communicating groove 34 from the second induction groove 27 provided at the end plate 30a.

As described above, according to the permanent magnet type rotor 10 of the first exemplary embodiment of the invention, since the seal material 29 is filled into the flow path 28 from the opening portion 31 of the end plate 30a, the movement and fixing of the permanent magnet piece 21 to the outer peripheral side within the slot 23 can be performed at once without using a shim used in the related art rotor. Thus, not only the manufacturing time and the number of processes can be reduced but also the permanent magnet pieces 21 can be surely fixed to the outer peripheral sides of the corresponding slots 23, respectively, so that the permanent magnet pieces 21 can be prevented from wobbling and the efficiency of the motor can be improved.

Further, at the time of injecting the seal material 29 from the opening portion 31, an air vent path is secured by the communicating groove 34 of the end plate 30a. Further, even if the seal material 29 leaks from the communicating groove 34, the seal material 29 is contained within the axial groove 25. Thus, the influence on the air gap can be prevented. Further, since the communicating groove 34 is formed not at the rotor iron core 20 but at the end plate 30a, the efficiency of the motor is not influenced. Furthermore, since the first induction groove 26 is provided at the center portion in the longitudinal direction of the permanent magnet piece 21 or the slot 23, the seal material 29 can be injected between the permanent magnet piece 21 and the slot 23 in a well-balanced state, so that the permanent magnet piece 21 can be pushed and moved toward the outer peripheral side uniformly.

Second Exemplary Embodiment

Next, a permanent magnet type rotor according to a second exemplary embodiment of the invention will be explained with reference to FIG. 5. In the second exemplary embodiment, portions identical or similar to those of the first exemplary embodiment are referred to by common reference numerals, with explanation thereof being omitted or simplified.

Figure 5:
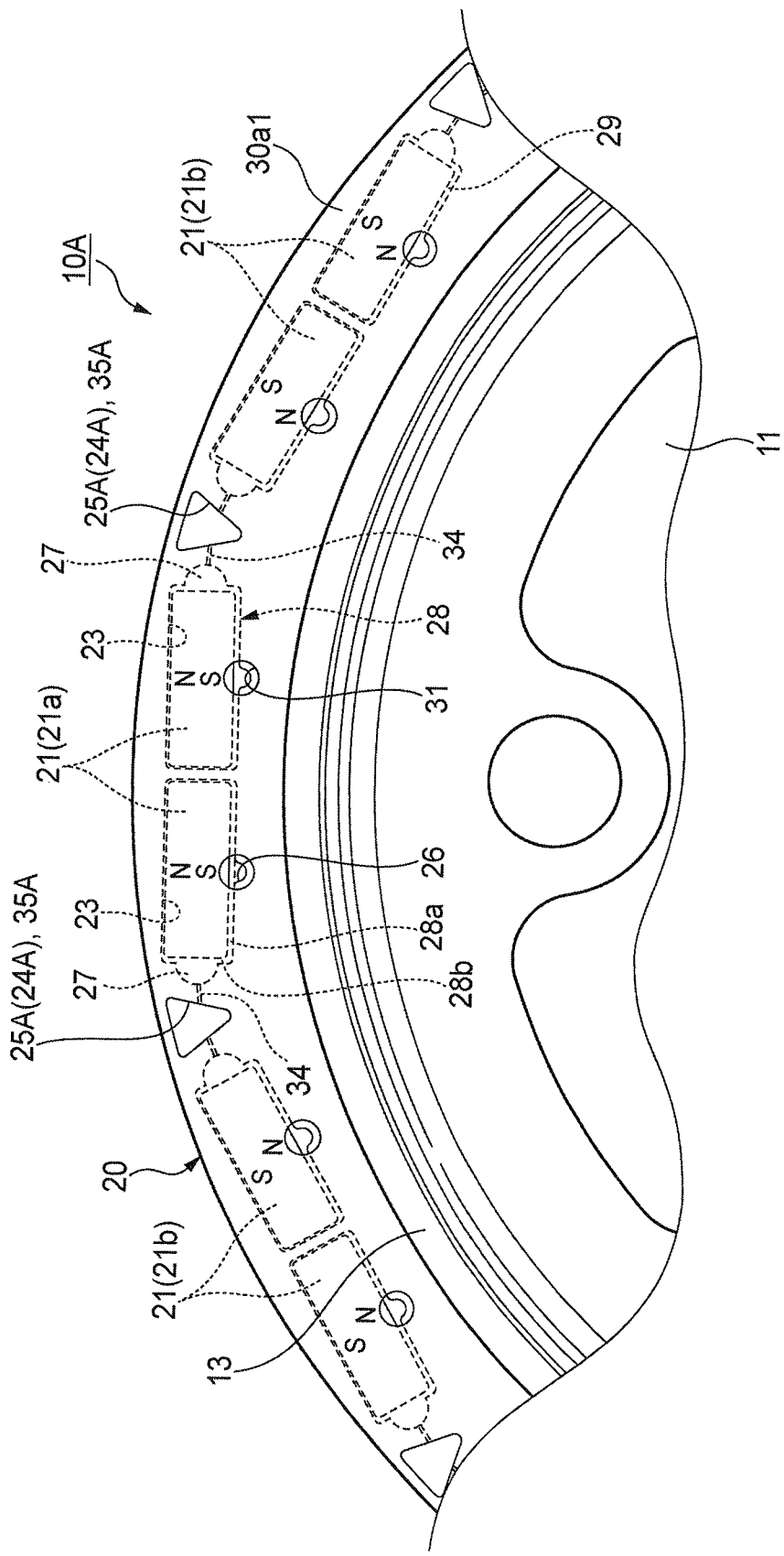
FIG. 5 is an enlarged front view of a permanent magnet type rotor according to a second exemplary embodiment of the invention.

As shown in FIG. 5, in the permanent magnet type rotor 10A according to the second exemplary embodiment, in place of the axial groove 25 of the first exemplary embodiment, a through hole 25A is provided within the rotor iron core 20 formed by the alignment of through holes 24A in each of the steel plates 19. A through hole 35A is also provided at one end plate 30a1. Thus, the magnetic poles of the permanent magnet pieces 21 are the same between adjacent through holes 25A and change at every through hole 25A. A communicating groove 34 provided at a surface 32 opposing to the rotor iron core 20 of the one end plate 30a1 acts to provide communications between a second induction groove 27 and the through hole 25A.

Thus, also in the second exemplary embodiment, even if the seal material 29 leaks from the communicating groove 34, since the seal material is contained within the through hole 25A, the influence of any air gap can be prevented. The remaining configuration and functions of the second exemplary embodiment are similar to those of the first exemplary embodiment.

Third Exemplary Embodiment

Next, a permanent magnet type rotor according to a third exemplary embodiment of the invention will be explained with reference to FIG. 6. In the third exemplary embodiment, portions identical or similar to those of the first exemplary embodiment are referred to by common reference numerals, with explanation thereof being omitted or simplified.

Figure 6:
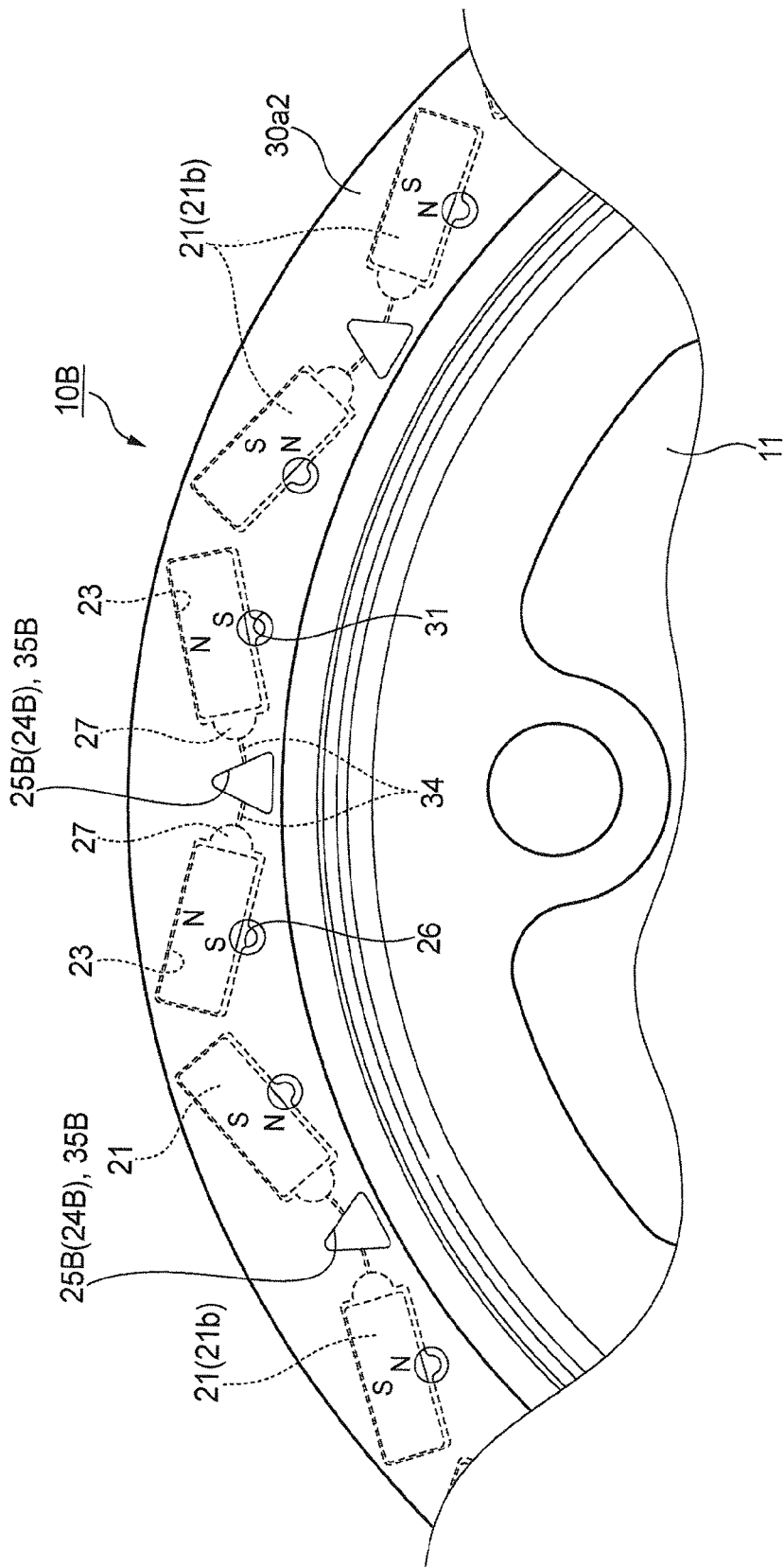
FIG. 6 is an enlarged front view of a rotor iron core in a permanent magnet type rotor according to a third exemplary embodiment of the invention.
Figure 7:
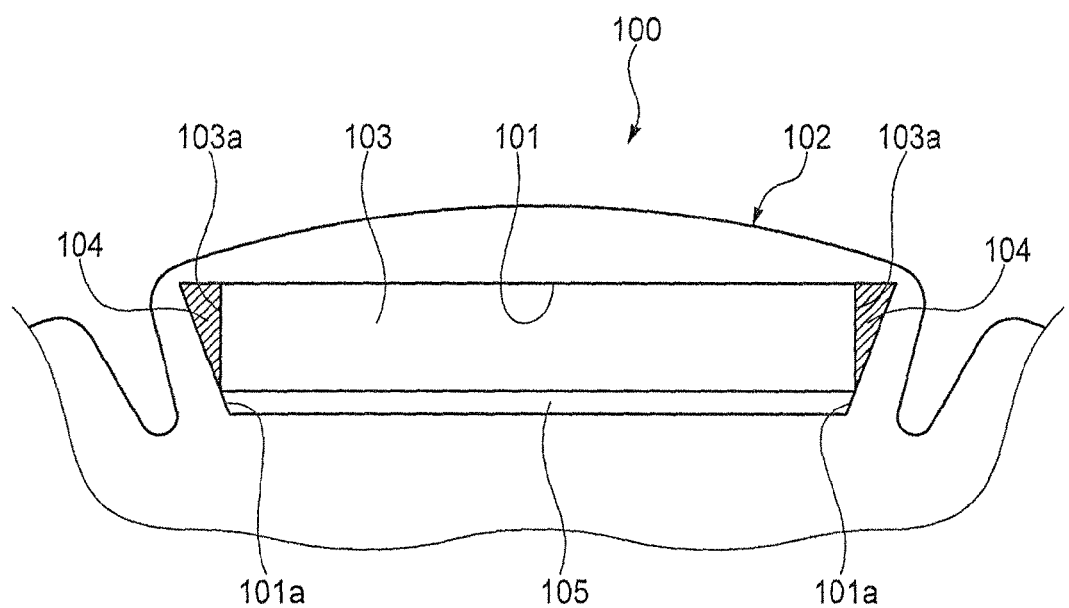
FIG. 7 is an enlarged front view of a related art permanent magnet type rotor.

As shown in FIG. 6, in the permanent magnet type rotor 10B according to the third exemplary embodiment, in place of the slots 23 disposed linearly, the two slots 23 are disposed in a V-shape. Further, a though hole 25B configured by aligning through holes 24B of each of the respective steel plates is provided at an apex of the V-shape of the two slots 23 and a through hole 35B is provided at one end plate 30a2. Thus, the though hole 25B is provided at the apex position of the V-shaped two slots 23. Further, a second induction groove 27 is provided at the end portion on the through hole 35B side of the slot 23 and communicates with the through hole 25B via the communicating groove 34. Further, in this configuration, the through hole 25B is sandwiched between the permanent magnet pieces 21 housed in the side slots 23. The permanent magnet pieces 21 are inserted into the slots 23 so as to have the same direction in their magnetic poles. The respective permanent magnet pieces 21 are disposed so as to change in the direction of their magnetic poles at every though hole 25B. That is, each of the through holes 25B is formed between the permanent magnet pieces 21 having a same directivity of the magnetic poles. In other words, unlike the first exemplary embodiment, where two permanent magnet pieces 21 are located between adjacent notches 25 or the second exemplary embodiment where the two permanent magnet pieces 21 are located between adjacent through holes 25A, in the third exemplary embodiment, two permanent magnet pieces 21 having a same polarity are located on either side of one through hole 25B.

Accordingly, also in the third exemplary embodiment, even if the seal material 29 leaks from the communicating groove 34, since the seal material 29 is contained within the through hole 25B, the influence on the air gap can be prevented. The remaining configuration and functions of the third exemplary embodiment are similar to those of the first exemplary embodiment.

MODIFICATIONS

The permanent magnet type rotor according to the invention is not limited to the aforesaid exemplary embodiments and suitable modifications and improvements, etc. may be made. For example, in each of the aforesaid exemplary embodiments, although the explanation is made as to the case where the one magnetic pole is configured by the two permanent magnet pieces 21, the invention can be applied to a case where one magnetic pole is configured by a single permanent magnet piece 21. In this case, since a single slot 23 is provided at every groove 25 or through hole 25B, the number of the opening portions 31 for filling the seal material 29 provided at the one end plate 30a is also single. Further, although the groove 25 or the through hole 25B is disposed at the both sides in the circumferential direction of the slot 23, the second induction groove 27 and the communicating groove 34 may be provided so as to communicate with the groove 25 or the through hole 25B on the one side or the grooves 25 or the through holes 25B on the sides.

While the present inventive concept has been shown and described with reference to certain exemplary embodiments thereof, it will be understood by those skilled in the art that various changes in form and details may be made therein without departing from the spirit and scope of the invention as defined by the appended claims.

What is claimed is:

1. A rotor, comprising:
   a rotor iron core comprising a plurality of slots formed around an outer circumferential portion thereof;
   a plurality of magnet pieces which are inserted into the plurality of slots, respectively, such that a magnetic orientation of the magnet pieces is changed every predetermined number of the slots; and
   two end plates, one end plate disposed on each end side in an axial direction of the rotor iron core, the two end plates covering the plurality of slots in the axial direction, wherein
   the rotor iron core further comprises a plurality of cutout portions, which are located at an interval between adjacent ones of the slots, each of the cutout portions extending in the axial direction of the rotor iron core,
   one of the two end plates comprises a plurality of injection openings, each of which corresponds to a respective one of the plurality of slots, and a plurality of communicating grooves each of which is formed so as to communicate with one of the cutout portions and with one of the plurality of slots.

2. A rotor according to claim 1, wherein
   the rotor iron core comprises a plurality of disc-shaped steel plates, each comprising a plurality of opening portions formed around an outer circumferential portion thereof, the disc-shaped steel plates being laminated together on top of one another such that the plurality of opening portions form the plurality of slots.

3. The rotor according to claim 1, wherein
   the plurality of cutout portions are a plurality of notches which extend in the axial direction of the rotor iron core.

4. The rotor according to claim 1, wherein
   the plurality of cutout portions are a plurality of through holes which extend in the axial direction of the rotor iron core.

5. The rotor according to claim 1, wherein
   each slot comprises a first induction groove that extends within the slot along a length of the magnet piece, and a second induction groove formed within the slot at an end of the magnet piece.

6. A permanent magnet type rotor according to claim 1, wherein
   each slot is provided with a flow path comprising a first induction groove which is opened on an inner peripheral side in a radial direction of the slot and extends in the axial direction, and a second induction groove which is provided on at least one end portion in a circumferential direction of the slot, opens on the end portion in the circumferential direction and extends in the axial direction, and is coupled to the first induction groove via a gap between the slot and the magnet piece,
   the communicating groove is formed so as to connect the second induction groove with the cutout portion, and
   seal material is filled at least into the flow paths of the rotor iron core.

7. A permanent magnet type rotor according to claim 6, wherein
   the first induction groove is provided at a center portion in a longitudinal direction of the slot when seen from the axial direction.

8. The rotor according to claim 1, wherein
   each of the plurality of communicating grooves is provided on a surface of the one of the two end plates, the surface opposing the rotor iron core.

* * * * *